United States Patent
Dasgupta

(10) Patent No.: US 9,129,317 B2
(45) Date of Patent: Sep. 8, 2015

(54) METHOD, MEDIUM, AND SYSTEM FOR PROVIDING LOCATION AWARE CLASSIFIED CONTENT

(75) Inventor: Sudeep Dasgupta, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 933 days.

(21) Appl. No.: 12/169,032

(22) Filed: Jul. 8, 2008

(65) Prior Publication Data

US 2010/0010907 A1    Jan. 14, 2010

(51) Int. Cl.
    *G06Q 30/00*        (2012.01)
    *G06Q 30/06*        (2012.01)

(52) U.S. Cl.
    CPC ............ *G06Q 30/06* (2013.01); *G06Q 30/0601* (2013.01)

(58) Field of Classification Search
    CPC .................................................. G06Q 30/0258
    USPC .......................................... 705/26, 27, 14.56
    See application file for complete search history.

(56) References Cited

U.S. PATENT DOCUMENTS

| | | | |
|---|---|---|---|
| 6,321,334 B1 * | 11/2001 | Jerger et al. ..................... | 726/1 |
| 6,658,455 B1 * | 12/2003 | Weinman, Jr. ................ | 709/203 |
| 2003/0064705 A1 * | 4/2003 | Desiderio ...................... | 455/412 |
| 2003/0065805 A1 * | 4/2003 | Barnes, Jr. ..................... | 709/231 |
| 2004/0068477 A1 * | 4/2004 | Gilmour et al. ................... | 707/1 |
| 2004/0083474 A1 * | 4/2004 | McKinlay et al. ............ | 717/176 |
| 2005/0038876 A1 * | 2/2005 | Chaudhuri ..................... | 709/219 |
| 2005/0137981 A1 * | 6/2005 | Maes .............................. | 705/44 |
| 2005/0216362 A1 * | 9/2005 | Navar et al. ..................... | 705/26 |
| 2006/0139454 A1 * | 6/2006 | Trapani ......................... | 348/148 |
| 2006/0282536 A1 * | 12/2006 | Popkin et al. ................. | 709/226 |
| 2007/0124216 A1 * | 5/2007 | Lucas ............................. | 705/27 |
| 2009/0012878 A1 * | 1/2009 | Tedesco et al. .................. | 705/27 |
| 2009/0313138 A1 * | 12/2009 | Ratnakar ........................ | 705/27 |
| 2010/0267367 A1 * | 10/2010 | Booth et al. ............... | 455/414.1 |

OTHER PUBLICATIONS

Mar. 2006—https://web.archive.org/web/20060318105441/http://support.microsoft.com/kb/306525.*
Dormann, Will, and Jason Rafail. "Securing your web browser." CERT, Jan. 23, 2006.*

* cited by examiner

*Primary Examiner* — Matthew Zimmerman

(57) ABSTRACT

A system and method in accordance with exemplary embodiments may include receiving, from a seller system, seller classified profile information via a network, receiving, from a buyer system, buyer classified profile information via the network, receiving, from a Global Positioning System (GPS) enabled device associated with a buyer, polling information via the network, matching the buyer classified profile information to the seller classified profile information in response to receiving the polling information based on at least one of the seller classified profile information, the buyer classified profile information, and the polling information, and transmitting a notification of the match to the Global Positioning System (GPS) enabled device via the network.

17 Claims, 6 Drawing Sheets

METHOD, MEDIUM, AND SYSTEM FOR PROVIDING LOCATION AWARE CLASSIFIED CONTENT

BACKGROUND INFORMATION

People may frequently use a classified media source (e.g., the classified portion of a local newspaper) to list items that are for sale and/or search for items to purchase. In some instances, people that are interested in purchasing particular items, may desire to view the items of interest in-person prior to purchasing the items. During everyday travel time, many interested buyers may pass by the locations of the items of interest. These locations of the items of interest may go unnoticed due to a lack of awareness of their existence.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

Figure 1:
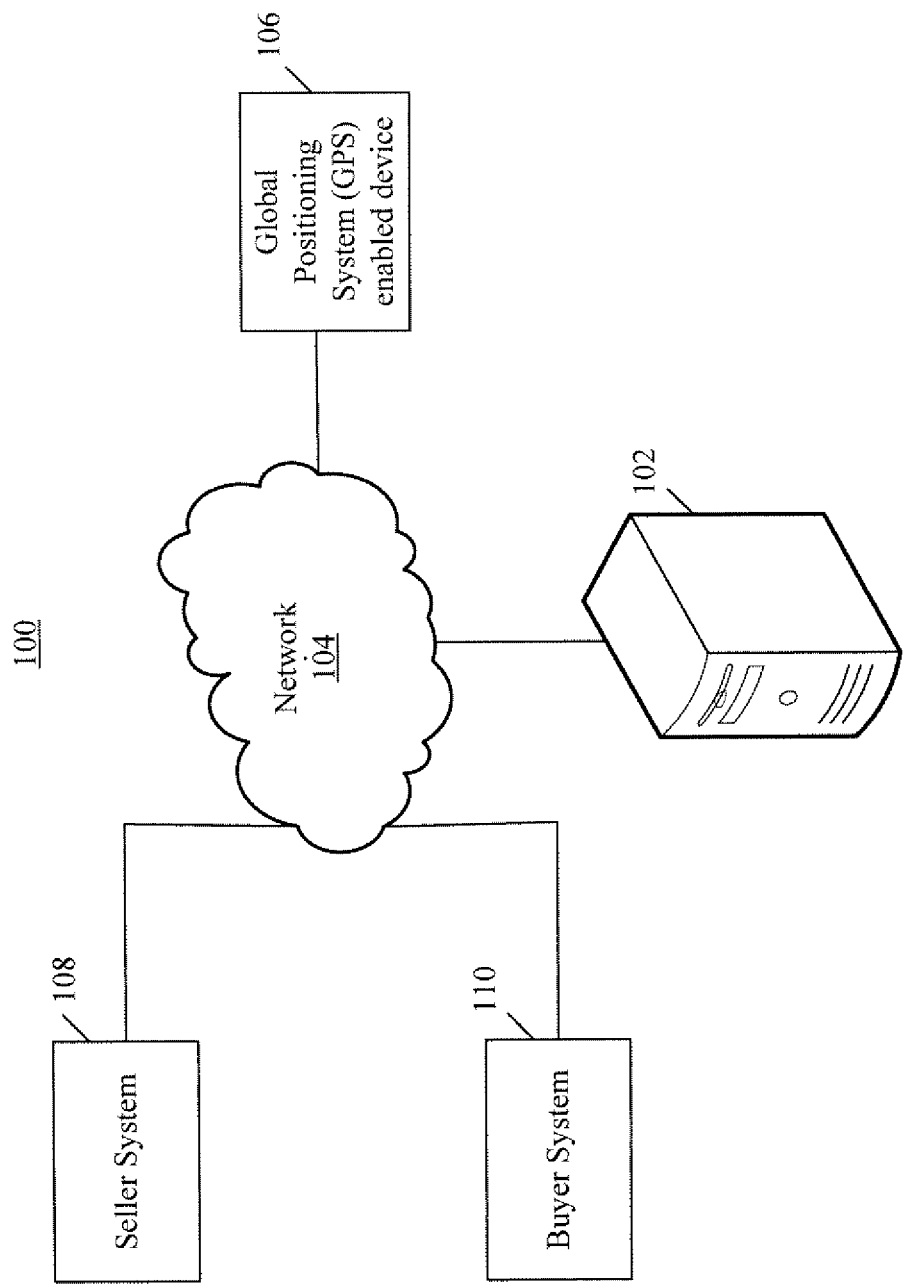
FIG. 1 illustrates a block diagram of a classified system in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes servers, systems, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, systems, mobile devices, and network elements, etc.) separately. The functions described as being performed at various components may be performed at other components, and the various components may be combined and/or separated. Other modifications also may be made.

In an exemplary embodiment, a classified system may match buyer classified profile information to seller classified profile information based on at least comparing buyer classified profile information to seller classified profile information. Seller classified profile information may include seller classified data associated with the sale of one or more items by a particular seller. For example, a seller may use the classified system to input seller information into a seller classified profile to list, sale, and/or offer to sale one or more products and/or services. Buyer classified profile information may include buyer classified data associated with the purchase of one or more items of interest by a particular buyer. For example, a buyer may use the classified system to input buyer information into a buyer classified profile to match (e.g., search for, locate) one or more items of interest to one or more items for sale by a seller.

Matching buyer classified profile information to seller classified profile information may include comparing one or more fields of the buyer classified profile information to one or more fields of the seller classified profile information. For example, the classified system may match buyer classified profile information to seller classified profile information by at least comparing an "Item Description" field of each of the profiles (e.g., buyer, seller).

Matching buyer classified profile information to seller classified profile information may also include comparing polling information received from a Global Positioning System (GPS) enabled device associated with the buyer to buyer classified profile information and/or seller classified profile information. Polling information may include a geotag associated with an approximate location of a Global Positioning System (GPS) enabled device. For example, matching buyer classified profile information to seller classified profile information may include comparing one or more geotags associated with a Global Positioning System (GPS) enabled device associated with the buyer to one or more fields of the seller classified profile information (e.g., "Location" field).

In various embodiments, the classified system may transmit a notification of a match and/or location aware classified content associated with one or more items of interest to the Global Positioning System (GPS) enabled device associated with the buyer to indicate that the approximate location of the Global Positioning System (GPS) enabled device is within the vicinity (e.g., within 1 mile, within 2 miles, within 3 miles) of one or more items of interest (e.g., a refrigerator) that are for sale by one or more sellers. Location aware classified content may include information associated with the match of one or more items of interest with one or more products and/or services for sale by one or more sellers based on the approximate location of a Global Positioning System (GPS) enabled device associated with a buyer. In various embodiments, the classified system may transmit purchase information associated with the one or more items of interest for sale and/or contact information associated with the one or more sellers. Purchase information may include the price of one or more items of interest for sale, the preferred method of payment, banking information, and/or any other information that may be used to purchase one or more items of interest that are for sale. Contact information may include any information that may be used to contact the seller. For example, contact information may include one or more of home phone numbers, cell phone numbers, home addresses, work addresses, email addresses, Instant Messaging (IM) screen names, meeting locations of one or more sellers.

FIG. 1 illustrates a block diagram of a classified system 100 in accordance with exemplary embodiments. A server 102 may receive periodic location signals from a Global Positioning System (GPS) enabled device 106 that is associated with a buyer. It should be noted that the term "approximate location" may be used herein due to the built-in inaccuracies of Global Positioning System (GPS) technology. The location signals may include a geotag that references the location (e.g., latitude coordinates and longitude coordinates) of the Global Positioning System (GPS) enabled device 106. Based on the geotag, the server 102 may perform a search for seller classified profile information that matches one or more items of interest listed in the buyer classified profile information. Accordingly, the server 102 may perform a search for seller classified profile information that is associated with one or more items of interest that are located near the approximate location of the Global Positioning System (GPS) enabled device 106. The server 102 may provide the search results and/or match results to a Global Positioning System (GPS) enabled device 106 associated with the buyer based on the approximate location of the Global Positioning System (OPS) enabled device 106.

In exemplary embodiments, the classified system 100 may include a server 102 communicatively coupled to a network 104, a Global Positioning System (GPS) enabled device 106 communicatively coupled to the network 104, a seller system 108 communicatively coupled to the network 104, and/or a buyer system 110 communicatively coupled to the network 104. The network 104 may communicate location aware classified content signals from the server 102 to the Global Positioning System (GPS) enabled device 106. It is noted that classified system 100 illustrates a simplified view of various components included in a classified system 100, and that other hardware devices and software not depicted may be included in the classified system 100. It is also noted that the classified system 100 illustrates only a single server 102, a single network 104, a single Global Positioning System (GPS) enabled device 106, a single seller system 108, and a single buyer system 110. It will be appreciated that multiple instances of these devices may be used.

The network 104 may include an analog telephone network, a digital telephone network, a cellular telephone network, a public wide area network ("WAN"), such as the Internet, or, different connections, such as combinations of public and private WANS, local areas networks ("LANs"), wireless LANs, encrypted networks, body area networks, Global Positioning System (GPS) networks, or other wired or wireless networks. In an exemplary embodiment, the network 104 may include one or more networks operating as a stand-alone network or in cooperation with each other. Use of the term network herein is not intended to limit the network to a single network.

In an exemplary embodiment, the server 102 may receive a request from a buyer system 110 associated with the Global Positioning System (GPS) enabled device 106 for location aware classified content at least based on the Global Positioning System (GPS) enabled device's 106 approximate location. In an exemplary embodiment, the server 102 may receive a request from a Global Positioning System (GPS) enabled device 106 for location aware classified content at least based on the Global Positioning System (GPS) enabled device's 106 approximate location. Based on the request, the server 102 may search for, match, and provide location aware classified content to a Global Positioning System (GPS) enabled device 106.

The location aware classified content signals may be, for example, video signals and/or audio signals, data, requests, other digital information, and/or combinations thereof. The location aware classified content signals may be used to display location aware classified content using a display module associated with the Global Positioning System (GPS) enabled device 106. Location aware classified content may be video, audio, text, and/or other types of visual or audible information.

The server 102 may periodically receive a polling message (e.g., polling information) from the Global Positioning System (GPS) enabled device 106 and may aggregate the polling data (e.g., a geotag) included in the polling message to determine the approximate location of the Global Positioning System (UPS) enabled device 106, to determine if the Global Positioning System (GPS) enabled device 106 is near one or more items of interest as listed in a buyer classified profile, and to search for location aware classified content by matching buyer classified profile information to seller classified profile information at least based on the polling message received from the Global Positioning System (GPS) enabled device 106. The server 102 may also generate and communicate the location aware classified content signal to the Global Positioning System (UPS) enabled device 106 via the network 104.

In exemplary embodiments, the server 102 may also receive a request from the Global Positioning System (GPS) enabled device 106 for location aware classified content that is associated with one or more items of interest already listed in the buyer classified profile and/or new to the buyer classified profile. Based on the polling data (e.g., a geotag) associated with the request, the server 102 may search for location aware classified content by matching buyer classified profile information to seller classified profile information. The server 102 may also generate and communicate the location aware classified content signal to the Global Positioning System (GPS) enabled device 106 via the network 104.

In exemplary embodiments, the server 102 may also generate and/or communicate a purchase message (e.g., purchase information) and/or a contact message (e.g., contact information) associated with the location aware classified content to the Global Positioning System (GPS) enabled device 106 via the network 104. In exemplary embodiments, the server 102 may communicatively couple the Global Positioning System (GPS) enabled device 106 to a seller system 108 using one or more real-time or near real-time communication mediums (e.g., speaking, text messaging, Instant Messaging, etc.). In exemplary embodiments, the server 102 may facilitate the purchase of one or more items of interest through a purchase transaction using one or more billing systems (not shown) associated with the classified system 100.

In an exemplary embodiment, the Global Positioning System (GPS) enabled device 106 may be a hardware device that may receive a location aware classified content signal from the network 104, may cause display and/or playing of the location aware classified content signal using a display module and/or speaker module associated with the Global Positioning System (GPS) enabled device 106, and may communicate messages to the network 104. For example, the Global Positioning System (GPS) enabled device 106 may cause display of text data using a display module associated with the Global Positioning System (GPS) enabled device 106.

In various exemplary embodiments, the Global Positioning System (GPS) enabled device 106 may be hardware device that may receive a purchase message and/or a contact message from the server 102 via the network 104. In various exemplary embodiments, the Global Positioning System (GPS) enabled device 106 may communicate with one or more seller systems 108 using one or more real-time communication mediums (e.g., speaking, text messaging, Instant Messaging, etc.).

The Global Positioning System (GPS) enabled device 106 may include wireless telephones, cellular telephones, mobile telephones, or satellite telephones, Personal Digital Assistants (PDA), portable computers, handheld MP3 players, handheld video players, personal media players, watches, gaming devices, Global Positioning System (GPS) navigation devices, portable televisions, or any other Global Positioning System (GPS) enabled devices 106 capable of receiving location aware classified content signals, purchase messages, and/or contact messages.

In an exemplary embodiment, a buyer system 110 may be a hardware device that may output (e.g., display) a buyer classified profile information graphical user interface (GUI) using a display device (not shown) and/or receive buyer classified profile information from one or more buyer users (e.g., buyers). In an exemplary embodiment, the buyer system 110 may communicate the buyer classified profile information to the server 102 via the network 104. The buyer system 110 may include, but is not limited to, a computer device and/or a communication device, such as, e.g., a personal computer (PC), a workstation, a handheld PC, a personal digital assistant (PDA), a thin system, a fat system, a network appliance, an Internet browser, an interactive television, a server, or any other communication device capable of transmitting buyer classified profile information to the server 102 via the network 104. In an exemplar embodiment, the buyer system 110 may also include an interface to display information received from the classified system 100 via the network 104.

In an exemplary embodiment, a seller system 108 may be a hardware device that may output (e.g., display) a seller classified profile information graphical user interface (GUI) using a display device (not shown) and/or receive seller classified profile information from one or more seller users (e.g., sellers). In an exemplary embodiment, the seller system 108 may communicate the seller classified profile information to the server 102 via the network 104. The seller system 108 may include, but is not limited to, a computer device and/or a communication device, such as, e.g., a personal computer (PC), a workstation, a handheld PC, a personal digital assistant (PDA), a thin system, a fat system, a network appliance, an Internet browser, an interactive television, a server, or any other communication device capable of transmitting seller classified profile information to the server 102 via the network 104. In an exemplary embodiment, the seller system 108 may also include an interface to display information received from the classified system 100 via the network 104. The server 102 and the Global Positioning System (OPS) enabled device 106 are discussed in further detail below.

Figure 2:
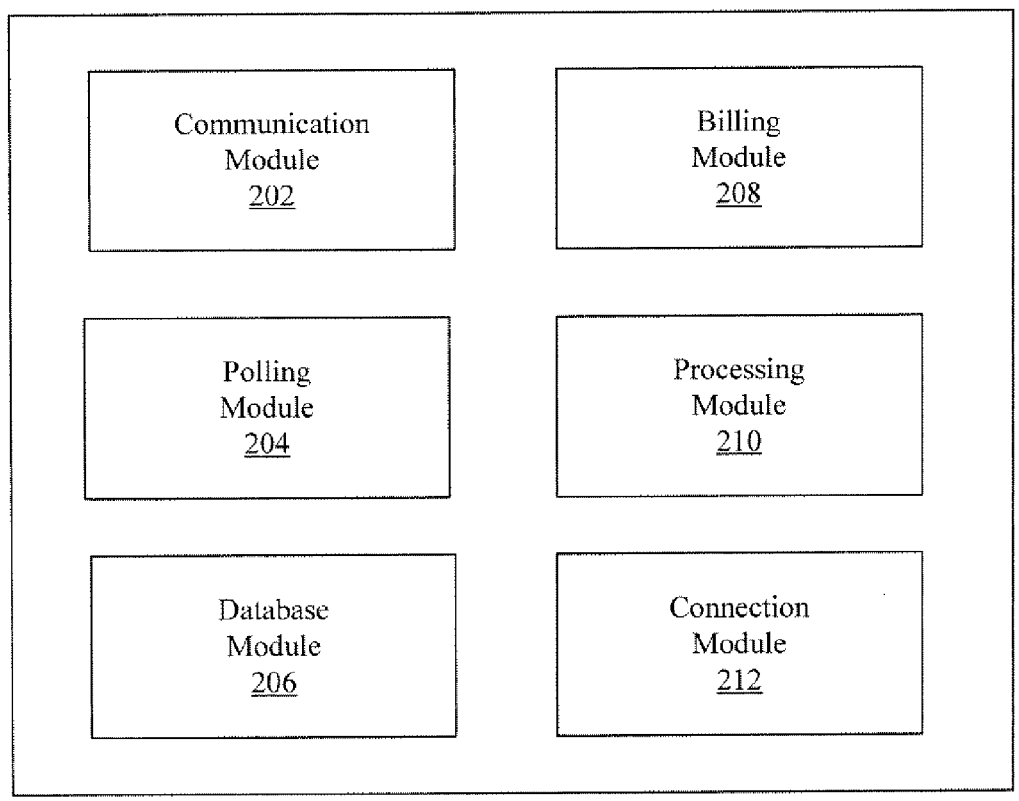
FIG. 2 illustrates exemplary modules of a server in accordance with exemplary embodiments.

FIG. 2 illustrates exemplary modules of a server 102 in accordance with exemplary embodiments. In an exemplary embodiment, the server 102 may include a communication module 202, a polling module 204, a database module 206, a billing module 208, a processing module 210, and a connection module 212. It is noted that the modules 202, 204, 206, 208, 210, and 212 are exemplary. The functions of the modules 202, 204, 206, 208, 210, and 212 may be performed at other modules remote or local to the server 102, and the modules 202, 204, 206, 208, 210, and 212 may be combined and/or separated.

The database module 206 may include software and/or hardware configured to access one or more seller classified profiles created by one or more seller users and/or one or more buyer classified profiles created by one or more buyer users associated with one or more Global Positioning System (GPS) enabled devices 106. The database module 206 may include software and/or hardware configured to store and/or analyze a buyer classified profile to determine if a buyer classified profile is associated with a particular Global Positioning System (GPS) enabled device 106. The database module 206 may identify one or more buyer classified profiles associated with one or more Global Positioning System (CPS) enabled devices 106 by assigning a unique identification number to each buyer classified profile associated with a particular buyer user and/or Global Positioning System (GPS) enabled device 106.

The database module 206 may store buyer classified profile information which may include one or more buyer user rules indicating what location aware classified content should be transmitted to the Global Positioning System (GPS) enabled device 106 and/or how the location aware classified content should be transmitted to the Global Positioning System (GPS) enabled device 106. The one or more buyer user rules may be applied to the location aware classified content by the server 102 prior to transmission. In various embodiments, a buyer user rule may include the rule that the server 102 notify the buyer user associated with the Global Positioning System (GPS) enabled device 106 to receive input from the buyer user whether to transmit the location aware classified content prior to transmitting location aware classified content to the Global Positioning System (GPS) enabled device 106. In various embodiments, a buyer user rule may include the rule that the server 102 may transmit specific types of relevant location aware classified content without permission from the buyer user associated with the Global Positioning System (GPS) enabled device 106. For example, location aware classified content that is associated with a price that is less than a maximum amount (e.g., all location aware classified content that is associated with one or more items of interest that are less than $50.00) and/or location aware classified content that is within a particular vicinity (e.g., all location aware classified content that is within 1 mile of the approximate location of the Global Positioning System (GPS) enabled device 106) may be automatically transmitted to the Global Positioning System (GPS) enabled device 106. In various embodiments, a buyer user rule may dictate that the server 102 notify the buyer user prior to transmission of any location aware classified content. In various embodiments, a buyer user rule may include the rule that there are no buyer user rules. Accordingly, the server 102 may transmit any location aware classified content retrieved based on a periodic polling of the Global Positioning System (GPS) enabled device's 106 location or a request for relevant location aware classified content from the Global Positioning System (GPS) enabled device 106.

The database module 206 may include software and/or hardware configured to update buyer classified profile information as it is modified by a buyer user using the Global Positioning System (GPS) enabled device 106 and/or a buyer system 110. For example, the Global Positioning System (GPS) enabled device 106 may transmit new and/or additional items of interest from the Global Positioning System (GPS) enabled device 106 to the server 102 while traveling and/or prior to traveling. Server 102 may update the buyer classified profile information based on these changes. Based on the updated buyer classified profile information received, the server 102 may modify one or more search queries prior to retrieving location aware classified content.

The polling module 204 may include software and/or hardware configured to periodically receive polling messages from the Global Positioning System (GPS) enabled device 106. Polling messages may include polling data (e.g., geotag) associated with the Global Positioning System (CPS) enabled device's 106 approximate location. Based on one or more geotags received from the Global Positioning System (GPS) enabled device 106, the server 102 may perform a search for location aware classified content using buyer classified profile information associated with the Global Positioning System (GPS) enabled device 106. Accordingly, the server 102 may access the database module 206 to analyze buyer classified profile information and/or seller classified profile information.

The processing module 210 may include software and/or hardware configured to receive a request to search for one or more items of interest and/or a request to match one or more items of interest to one or more items for sale from the buyer system 10 and/or the Global Positioning System (GPS) enabled device 106. For example, the processing module 210 may receive a request for location aware classified content based on the Global Positioning System (GPS) enabled device's 106 approximate location. The processing module 210 may use the geotag associated with the request information and the buyer classified profile information to formulate a search query that results in relevant location aware classified content.

In exemplary embodiments, the processing module 210 may formulate a search query based on the polling information provided by the polling module 204 and the buyer classified profile information provided by the database module 206. Accordingly, the processing module 210 may merge the information from the polling module 204 and the database module 206, create a search query which results in the identification and/or retrieval of relevant location aware classified content. The processing module 210 may also store the search query results.

The processing module 210 may also include software and/or hardware to analyze one or more seller classified profiles to determine if a particular seller classified profile is a search result and/or a match result. To determine if a particular seller classified profile is a search result and/or a match result the processing module 210 may compare one or more fields associated with a buyer classified profile and/or one or more received geotags to one or more fields associated with the particular seller classified profile. For example, a buyer classified profile may list a refrigerator as an item of interest and may be associated with a Global Positioning System (GPS) enabled device 106 that transmits a geotag with an approximate location of Phoenix, Ariz. Based on this information, the processing module 210 may search for and/or match one or more seller classified profiles stored in the database module 210 that indicates that a refrigerator is for sale and that the refrigerator is located within a certain number of miles (e.g., five miles) of Phoenix, Ariz. and/or the Global Positioning System (GPS) enabled device 106. In various embodiments, buyer classified profile information and/or seller classified profile information may include information that has been inputted using a buyer user specific taxonomy and/or a seller user specific taxonomy. The processing module 210 may include parsing software to decipher buyer classified profile information and/or seller classified profile information using a buyer user specific taxonomy and/or a seller user specific taxonomy.

The billing module 208 may include software and/or hardware configured to access and/or transmit purchase information associated with location aware classified content. For example, the billing module 208 may access one or more billing systems (e.g., a service provider implementing the classified system 100) associated with the classified system 100 to retrieve purchase information. In various embodiments, the billing module 208 may transmit purchase information associated with the location aware classified content to a buyer user via the Global Positioning System (GPS) enabled device 106. In an exemplary embodiment, the buyer user may transmit a purchase request (e.g., a request to purchase one or more items of interest provided in the location aware classified content) to the billing module 208 via the Global Positioning System (GPS) enabled device 106. If, for example, the buyer user is known to the billing module 208 based on past interactions, the billing module 208 may bill the amount of the one or more items of interest provided in the location aware classified content to the buyer user using one or more purchase transaction methods well known in the art (e.g., adding the cost of the one or more items of interest to a service bill, deducting the cost of the one or more items of interest from a banking account associated with the buyer user, charging the cost of the one or more items of interest to a credit account associated with the buyer user, purchasing the one or more items of interest using Paypal). If, however, the buyer user is not known to the billing module 208, the billing module 208 may request additional billing information and/or facilitate the purchase transaction between the buyer user and the seller user. In various embodiments, the billing module 208 may credit an account associated with the seller user by the amount of one or more items purchased by a buyer user.

The connection module 212 may include software and/or hardware configured to facilitate communication between a buyer user interested in purchasing one or more items of interest from a seller user. The connection module 212 may transmit one or more text-messages, one or more Instant Messages (N), one or more Emails, and/or any other real-time or near real-time communication messages to the buyer user and/or the seller user. For example, a buyer user may use the connection module 212 to transmit a message, such as, "Im interested in the refrigerator" to a seller user via a seller system 108. In various embodiments, the message may include a buyer user's contact information, such as, a telephone number, an email address, etc.

The communication module 202 may communicate location aware classified content signals from the server 102 to the network 104. The communication module 202 also may communicate messages received from the other modules 204, 206, 208, and 210 to the network 104, and may communicate messages to the other modules 204, 206, 208, and 210 received from the network 104. The communication module 202 may also generate the location aware classified content signal and may communicate the location aware classified content signal to the Global Positioning System (GPS) enabled device 106.

The server 102 may access the search query results and/or match results in the processing module 210 and one or more buyer user rules associated with the buyer classified profile information in the database module 206 to apply the one or more buyer user rules to the search query results and/or match results prior to transmitting the search query results and/or match results to the Global Positioning System (GPS) enabled device 106. Based on the one or more buyer user rules stored in the database module 206, the server 102 may transmit notification to the Global Positioning System (GPS)

enabled device 106 of the type of search query results and/or match results. The server 102 may also receive a response to the notification that may instruct the server 102 which, if any, of the search query results and/or match results should be transmitted to the Global Positioning System (GPS) enabled device 106.

Figure 3:
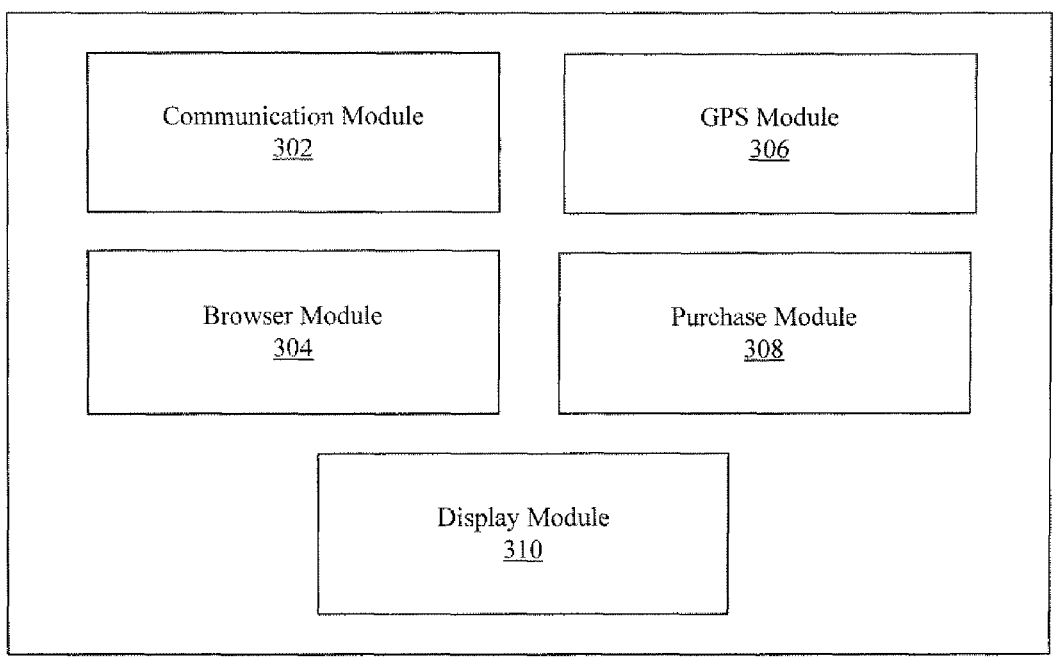
FIG. 3 illustrates exemplary modules of a Global Positioning System (GPS) enabled device in accordance with exemplary embodiments.

FIG. 3 illustrates exemplary modules of a Global Positioning System (GPS) enabled device 106 in accordance with exemplary embodiments. The Global Positioning System (GPS) enabled device 106 may receive the location aware classified content signal from the server 102 via the network 104, may cause display/playing of the location aware classified content signal, and may communicate various messages to the server 102 via the network 104.

In an exemplary embodiment, the Global Positioning System (GPS) enabled device 106 may include a communication module 302, a browser module 304, a Global Positioning System (GPS) module 306, a purchase module 308, and a display module 310. It is noted that the modules 302, 304, 306, 308, and 310 are exemplary. The functions of the modules 302, 304, 306, 308, and 310 may be performed by other modules remote or local to the Global Positioning System (GPS) enabled device 106, and the modules 302, 304, 306, 308, and 310 may be combined and/or separated.

The communication module 302 may provide communication between the Global Positioning System (GPS) enabled device 106 and the network 104. The communication module 302 may forward the location aware classified content signal and/or messages received from the network 104 to the other modules 304, 306, 308, and 310, and may communicate messages received from the modules 304, 306, 308, and 310 to the network 104.

The browser module 304 may include a web browser client installed on the Global Positioning System (GPS) enabled device 106, such as, but not limited to, INTERNET EXPLORER™, NAVIGATOR™, or FIREFOX™ web browser programs, offered by Microsoft Corporation of Redmond, Wash., Time Warner of New York, N.Y., and the Mozilla Foundation of Mountain View, Calif., respectively.

The web browser may be used to input and/or receive information from the server 102. For example, the web browser may be used to access and/or modify a buyer classified profile using the Global Positioning System (GPS) enabled device 106, access one or more search query results and/or match results, and/or create one or more messages (e.g., a message requesting contact information and/or purchase information) to be communicated to the server 102.

The Global Positioning System (GPS) module 306 may provide preferences to be set with regard to Global Positioning System (GPS) capabilities. For example, a buyer user may enable one or more Global Positioning System (GPS) capabilities using the Global Positioning System (GPS) module 306. In addition, a buyer user may set how often the Global Positioning System (GPS) module 306 may transmit polling information containing a geotag with the Global Positioning System (GPS) enabled device's 106 approximate location to the server 102. For example, the Global Positioning System (GPS) module 306 may be configured to transmit polling information to the server 102 every 60 seconds.

The purchase module 308 may provide purchase capabilities that may allow a buyer user to receive purchase information and respond to the purchase information. For example, a buyer user may respond to the purchase information requesting additional details regarding the one or more items of interest associated with the location aware classified content (e.g., age of one or more items of interest, brand of one or more items of interest). In addition, a buyer user may input billing information (e.g., credit card number, debit card number, banking account number) using the capabilities provided by the purchase module 308.

The display module 310 may control display of the location aware classified content signal and/or various graphical user interfaces associated with the Global Positioning System (GPS) enabled device 106. To cause display of the location aware classified content signal, the display module 310 may receive instructions from a user input device associated with the Global Positioning System (GPS) enabled device 106 (e.g., keyboard, stylus, scroll bar and the like) and may display a particular search query result and/or match result based on the received instructions. The display module 310 also may cause display of a graphical user interface associated with the web browser.

Figure 4:
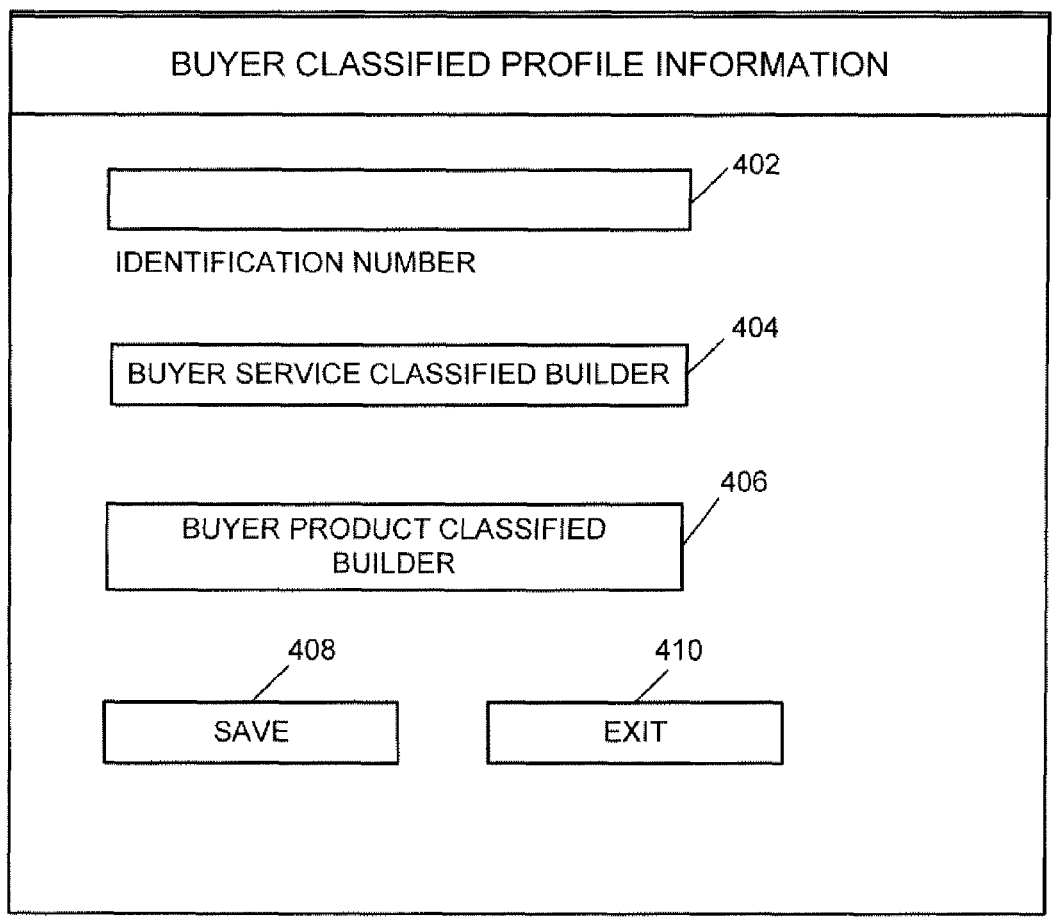
FIG. 4 illustrates a buyer classified profile graphical user interface in accordance with exemplary embodiments.

FIG. 4 illustrates a buyer classified profile graphical user interface 400 in accordance with exemplary embodiments. The buyer classified profile graphical user interface 400 may permit the buyer user to input buyer classified profile information via the buyer system 110 and/or the Global Positioning System (GPS) enabled device 106.

In an exemplary embodiment, the buyer classified profile graphical user interface 400 may be displayed in response to a buyer user request to view the buyer classified profile graphical user interface 400. For example, the buyer user may use a user input device associated with the buyer system 110 and/or the Global Positioning System (GPS) enabled device 106 to generate a buyer classified profile display request that requests the buyer system 110 and/or the Global Positioning System (GPS) enabled device 106 to cause display of the buyer classified profile graphical user interface 400. When the buyer classified profile display request is received, a display module of a buyer system 110 and/or the display module 310 of the Global Positioning System (GPS) enabled device 106 may generate the buyer classified profile graphical user interface 400.

If, for example, a buyer user is a returning buyer user, identification number data field 402 may be pre-filled. If, however, a buyer user is new, identification number data field 402 may be filled in by the buyer user using a newly assigned identification number that may have been transmitted to a buyer system 110, the Global Positioning System (GPS) enabled device 106, sent via snail mail, and/or any other methods of sending an identification number. An identification number may be used to associate one or more buyer classified profiles with one or more particular Global Positioning System (GPS) enabled devices 106.

By way of a non-limiting example, the buyer classified profile graphical user interface 400 may be arranged as depicted in FIG. 4. The buyer user may input information into an identification number data field using data field 402. Near the middle of the of the buyer classified profile information screen, the buyer user may have the choice to access one or more screens associated with a buyer service classified builder using button 404 and/or one or more screens associated with a buyer product classified builder using button 406. A buyer service classified builder may include one or more screens that receive information associated with one or more services of interest to the buyer user. For example, the buyer user may use the buyer service classified builder to input information associated with a land-scaping service (e.g., how much the buyer user is willing to pay, the size of the yard to be serviced, the tools provided by the buyer user). A buyer product classified builder may include one or more screens that receive information associated with one or more products of interest to the buyer user. For example, the buyer user may use the buyer product classified builder to input information associated with a wanted refrigerator (e.g., size of wanted refrigerator, brand of wanted refrigerator). In addition, the buyer user may save a buyer classified profile to the server 102 by activating (e.g., clicking on) a save button 408. The buyer user may also exit the buyer classified profile graphical user interface 400 by activating an exit button 410. In various embodiments, the buyer classified profile graphical user interface 400 may provide one or more screens (not shown) to allow a buyer user to delete one or more items of interest.

In exemplary embodiments, one or more screens associated with a buyer user rules builder (not shown) may include a list of one or more predetermined rules that a buyer user may select from, an input screen for the buyer user to create and/or input one or more buyer user rules, and/or any other screen to allow a buyer user to create and/or select one or more buyer user rules. In addition, a buyer user may input data into another data field that may be parsed using parsing software to decipher the data.

It is noted that the above description describes a buyer system 110 and/or a Global Positioning System (GPS) enabled device 106 causing display of the buyer classified profile graphical user interface 400 using a display module. The buyer classified profile graphical user interface 400 may be presented at a computer, mobile phone, or other device capable of presenting a graphical user interface local or remote to the buyer system 110 and/or the Global Positioning System (GPS) enabled device 106. For example, a buyer user may use their computer at work to access the buyer classified profile graphical user interface 400 to input buyer classified profile information to be used in combination with the server 102 and the Global Positioning System (OPS) enabled device 106.

Figure 5:
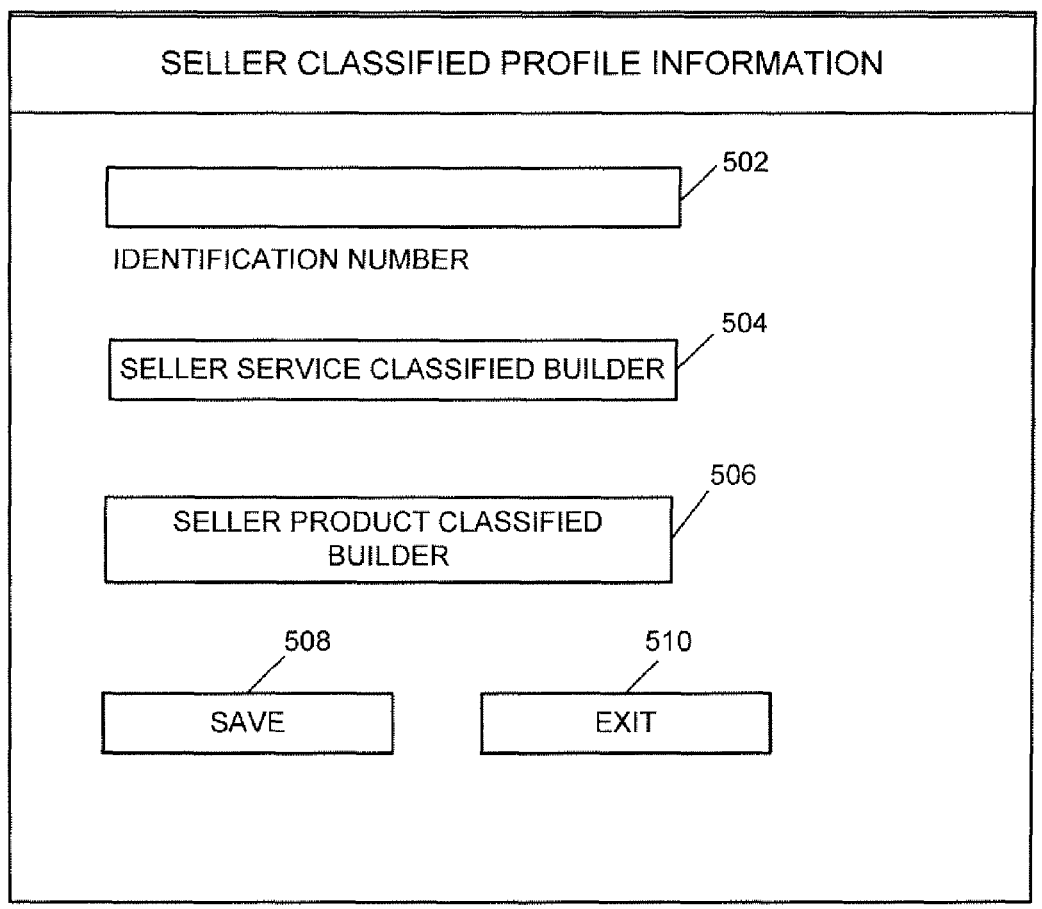
FIG. 5 illustrates a seller classified profile graphical user interface in accordance with exemplary embodiments.

FIG. 5 illustrates a seller classified profile graphical user interface 500 in accordance with exemplary embodiments. The seller classified profile graphical user interface 500 may permit the seller user to input seller classified profile information via the seller system 108.

In an exemplary embodiment, the seller classified profile graphical user interface 500 may be displayed in response to a seller user request to view the seller classified profile graphical user interface 500. For example, the seller user may use a user input device associated with the seller system 108 to generate a seller classified profile display request that requests the seller system 108 to cause display of the seller classified profile graphical user interface 500. When the seller classified profile display request is received, a display module of a seller system 108 may generate the seller classified profile graphical user interface 500.

If, for example, a seller user is a returning seller user, identification number data field 502 may be pre-filled. If, however, a seller user is new, identification number data field 502 may be filled in by the seller user using a newly assigned identification number that may have been transmitted to a seller system 108, sent via snail mail, and/or any other methods of sending an identification number.

By way of a non-limiting example, the seller classified profile graphical user interface 500 may be arranged as depicted in FIG. 5. The seller user may input information into an identification number data field using data field 502. Near the middle of the of the seller classified profile information screen, the seller user may have the choice to access one or more screens associated with a seller service classified builder using button 504 and/or one or more screens associated with a seller product classified builder using button 506. A seller service classified builder may include one or more screens that receive information associated with one or more services offered by the seller user. For example, the seller user may use the seller service classified builder to input information associated with a land-scaping service (e.g., the cost of the service, the servicing area). A seller product classified builder may include one or more screens that receive information associated with one or more products offered for sale by the seller user. For example, the seller user may use the seller product classified builder to input information associated with a refrigerator being offered for sale (e.g., size of refrigerator, brand of refrigerator). In addition, the seller user may save a seller classified profile to the server 102 by activating (e.g., clicking on) a save button 508. The seller user may also exit the seller classified profile graphical user interface 500 by activating an exit button 510. In various embodiments, the seller classified profile graphical user interface 500 may provide one or more screens (not shown) to allow a seller user to delete one or more items for sale.

In exemplary embodiments, the seller user may input the location of one or more products and/or services offered for sale using the seller classified profile graphical user interface 500.

It is noted that the above description describes a seller system 108 causing display of the seller classified profile graphical user interface 500 using a display module. The seller classified profile graphical user interface 500 may be presented at a computer, mobile phone, or other device capable of presenting a graphical user interface local or remote to the seller system 108. For example, a seller user may use their computer at work to access the seller classified profile graphical user interface 500 to input seller classified profile information to be stored on the server 102.

Figure 6:
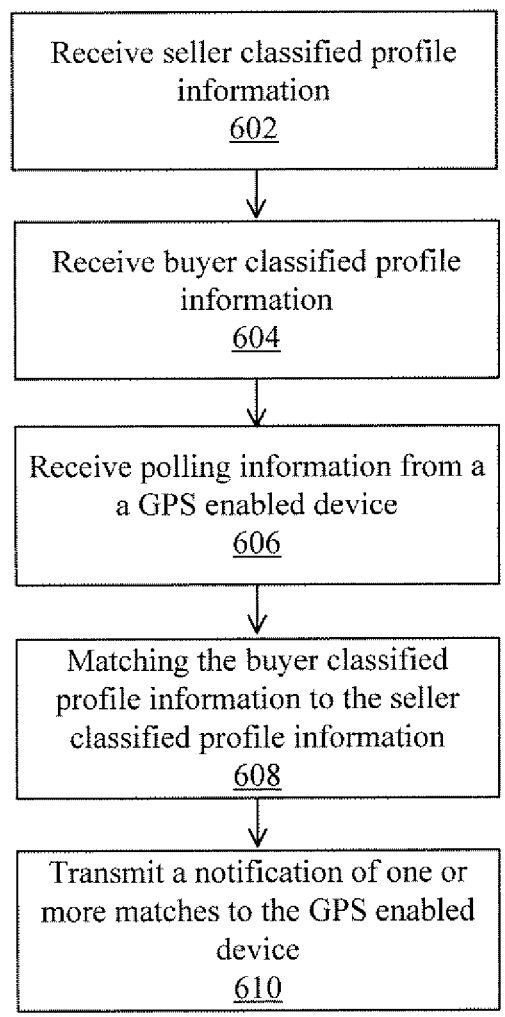
FIG. 6 illustrates a flowchart of a method for providing location aware classified content to a Global Positioning System (GPS) enabled device in accordance with exemplary embodiments.

FIG. 6 illustrates a flowchart of a method 600 for providing location aware classified content to a Global Positioning System (GPS) enabled device 106 in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the classified system 100 shown in FIG. 1 by way of example, and various elements of the classified system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include receiving seller classified profile information from a seller system 108. In an exemplary embodiment, the server 102 may receive seller classified profile information from a seller user using the seller classified profile graphical user interface 500 on a seller system 108. The method 600 may continue to block 604.

In block 604, the method 600 may include receiving buyer classified profile information from a buyer system 110 and/or a Global Positioning System (GPS) enabled device 106. In an exemplary embodiment, the server 102 may receive buyer classified profile information from a buyer user using the buyer classified profile graphical user interface 400 on a buyer system 110 and/or a Global Positioning System (GPS) enabled device 106. The method 600 may continue to block 606.

In block 606, the method 600 may include receiving polling information from the Global Positioning System (GPS) enabled device 106. In an exemplary embodiment, the server 102 may receive the polling information from the Global Positioning System (GPS) enabled device 106 via the network 104. The polling information may include the approximate location of the Global Positioning System (GPS) enabled device 106. The method 600 may continue to block 608.

In block 608, the method 600 may include matching the buyer classified profile information to the seller classified profile information. In an exemplary embodiment, the processing module 210 may match the buyer classified profile information to the seller classified profile information based on the approximate location of the Global Positioning System (GPS) enabled device 106 provided by the received polling information. The processing module 210 may also match the buyer classified profile information to the seller classified profile information by comparing one or more fields of the buyer classified profile information to one or more fields of the seller classified profile information. For example, the processing module 210 may match buyer classified profile information to seller classified profile information by at least comparing an "Item Description" field of each of the profiles (e.g., buyer, seller). The method 600 may continue to block 610.

In block 610, the method 600 may include transmitting a notification of one or more matches to the Global Positioning System (GPS) enabled device 106. In an exemplary embodiment, the server 102 may transmit a notification of one or more matches to the Global Positioning System (GPS) enabled device 106 based on one or more buyer user rules via the network 104. The method 600 may then end.

It should be noted that the classified system 100 described above may be used in applications other than the buying and/or selling of products and/or services. For example, the classified system 100 may be used in a date matching application (e.g., an application that provides information associated with one or more people of interest to a Global Positioning System (GPS) enabled device 106 based on the device's approximate location). Accordingly, a user interested in being alerted by the classified system 100 on a Global Positioning System (GPS) enabled device 106 of the presence of one or more people of interest within a particular vicinity may fill-out and/or save one or more profiles using the classified system 100. In various embodiments, the Global Positioning System (UPS) enabled device 106 may facilitate communication between the user and one or more people of interest using the Global Positioning System (GPS) enabled device 106. In various embodiments, the classified system 100 may be used in a property rental application, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, from a seller system, seller classified profile information via a network;
receiving, from a buyer system, buyer classified profile information via the network, wherein the buyer classified profile information comprises one or more user rules that indicate a transmission preference for transmission of a notification of a match;
receiving, from a Global Positioning System (GPS) enabled device associated with a buyer, polling information via the network, wherein the polling information comprises an approximate location of the GPS enabled device;
matching, in response to receiving the polling information, the buyer classified profile information to the seller classified profile information based on at least one of the seller classified profile information, the buyer classified profile information, and the polling information;
applying the one or more user rules to the notification of the match, wherein the one or more user rules specify one or more predetermined types of content associated with the notification of the match that are automatically transmitted;
performing a distance determination by determining whether the approximate location of the GPS enabled device is within a specified distance from a location associated with the matched seller classified profile information;
determining, by at least one computer processor, based on the one or more applied user rules and the distance determination, whether to receive input from the buyer associated with the GPS enabled device prior to transmitting the content associated with the notification of the match;
transmitting the notification of the match and the content associated with the notification of the match to the GPS enabled device via the network in accordance with the determination and the transmission preference indicated by the applied one or more user rules;
receiving purchase request information that comprises a request to purchase one or more items of interest associated with the match from the GPS enabled device via the network; and
billing the buyer associated with the GPS enabled device based on at least the purchase request information.

2. The method of claim 1, wherein receiving seller classified profile information further comprises receiving, from the seller system, data associated with selling at least one of a product and a service.

3. The method of claim 1, wherein receiving buyer classified profile information further comprises receiving, from the buyer system, data associated with purchasing at least one of a product and a service.

4. The method of claim 1, wherein matching the buyer classified profile information to the seller classified profile information further comprises comparing at least one field of a buyer classified profile information graphical user interface to at least one field of a seller classified profile information graphical user interface.

5. The method of claim 1, wherein transmitting the notification of the match further comprises transmitting at least one of seller contact information and purchase information to the GPS enabled device.

6. A non-transitory computer readable media comprising computer executable code, when run by a Global Positioning System (GPS) enabled device, instruct the GPS enabled device, to perform the acts of:
receiving, from a seller system, seller classified profile information via a network;
receiving, from a buyer system, buyer classified profile information via the network, wherein the buyer classified profile information comprises one or more user rules that indicate a transmission preference for transmission of a notification of a match;
receiving, from the Global Positioning System (GPS) enabled device associated with a buyer, polling information via the network, wherein the polling information comprises an approximate location of the GPS enabled device;

matching, in response to receiving the polling information, the buyer classified profile information to the seller classified profile information based on at least one of the seller classified profile information, the buyer classified profile information, and the polling information;

applying the one or more user rules to the notification of the match, wherein the one or more user rules specify one or more predetermined types of content associated with the notification of the match that are automatically transmitted;

performing a distance determination by determining whether the approximate location of the GPS enabled device is within a specified distance from a location associated with the matched seller classified profile information;

determining, based on the one or more applied user rules and the distance determination, whether to receive input from the buyer associated with the GPS enabled device prior to transmitting the content associated with the notification of the match;

transmitting the notification of the match and the content associated with the notification of the match to the GPS enabled device via the network in accordance with the determination and the transmission preference indicated by the applied one or more user rules;

receiving purchase request information that comprises a request to purchase one or more items of interest associated with the match from the GPS enabled device via the network; and billing the buyer associated with the GPS enabled device based on at least the purchase request information.

7. A system, comprising:

a database for storing data associated with at least one of buyer classified profile information and seller classified profile information; and a network element, including at least one computer processor communicatively coupled to a network, configured to:

receive, from a seller system comprising a first computer processor, seller classified profile information via the network;

receive, from a buyer system comprising a second computer processor, buyer classified profile information via the network, wherein the buyer classified profile information comprises one or more user rules that indicate a transmission preference for transmission of a notification of a match;

receive, from a Global Positioning System (GPS) enabled device associated with a buyer, polling information via the network, wherein the polling information comprises an approximate location of the GPS enabled device;

match, in response to receiving the polling information, the buyer classified profile information to the seller classified profile information based on at least one of the seller classified profile information, the buyer classified profile information, and the polling information;

apply the one or more user rules to the notification of the match, wherein the one or more user rules specify one or more predetermined types of content associated with the notification of the match that are automatically transmitted;

perform a distance determination to determine whether the approximate location of the GPS enabled device is within a specified distance from a location associated with the matched seller classified profile information;

determine, based on the one or more applied user rules and the distance determination, whether to receive input from the buyer associated with the GPS enabled device prior to transmission of the content associated with the notification of the match;

transmit the notification of the match and the content associated with the notification of the match to the GPS enabled device via the network in accordance with the determination and the transmission preference indicated by the applied one or more user rules;

receive purchase request information that comprises a request to purchase one or more items of interest associated with the match from the GPS enabled device; and bill the buyer associated with the GPS enabled device based on at least the purchase request information.

8. The system of claim 7, wherein the GPS enabled device is one of: a cellular phone, a portable computer, a gaming device, a personal media player, a portable television, GPS navigation device, and a Personal Digital Assistant (PDA).

9. The system of claim 7, wherein the network element is further configured to match the buyer classified profile information to the seller classified profile information by at least comparing at least one field of a buyer classified profile information graphical user interface to at least one field of a seller classified profile information graphical user interface.

10. The system of claim 7, wherein the network element is further configured to transmit the notification of the match comprising at least one of seller contact information and purchase information.

11. A method, comprising:

receiving, from a seller system, seller classified profile information via a network;

receiving, from a buyer system, buyer classified profile information via the network, wherein the buyer classified profile information comprises one or more user rules that indicate a transmission preference for transmission of a notification of a match;

receiving, from a Global Positioning System (GPS) enabled device, polling information via the network, wherein the polling information comprises an approximate location of the GPS enabled device;

matching, in response to receiving the polling information, the buyer classified profile information to the seller classified profile information based on the seller classified profile information, the one or more user rules associated with the buyer classified profile information, and the polling information;

applying the one or more user rules to the notification of the match, wherein the one or more user rules specify one or more predetermined types of content associated with the notification of the match that are automatically transmitted;

performing a distance determination by determining whether the approximate location of the GPS enabled device is within a specified distance from a location associated with the matched seller classified profile information;

determining, by at least one computer processor, based on the one or more applied user rules and the distance determination, whether to receive input from the buyer associated with the GPS enabled device prior to transmitting the content associated with the notification of the match;

transmitting the notification of the match and the content associated with the notification of the match to the GPS enabled device via the network in accordance with the determination and the transmission preference indicated by the applied one or more user rules;

receiving purchase request information that comprises a request to purchase one or more items of interest associated with the match from the GPS enabled device via the network; and billing a buyer associated with the GPS enabled device based on at least the purchase request information.

12. The method of claim 11, wherein receiving seller classified profile information further comprises receiving, from the seller system, data associated with selling at least one of a product and a service.

13. The method of claim 11, wherein receiving buyer classified profile information further comprises receiving, from the buyer system, data associated with purchasing at least one of a product and a service.

14. A non-transitory computer readable media comprising computer executable code, when run by a Global Positioning System (GPS) enabled device, instruct the GPS enabled device, to perform the acts of:

receiving, from a seller system, seller classified profile information via a network;

receiving, from a buyer system, buyer classified profile information via the network, wherein the buyer classified profile information comprises one or more user rules that indicate a transmission preference for transmission of a notification of a match;

receiving, from the GPS enabled device, polling information via the network, wherein the polling information comprises an approximate location of the GPS enabled device;

matching, in response to receiving the polling information, the buyer classified profile information to the seller classified profile information based on the seller classified profile information, the one or more user rules associated with the buyer classified profile information, and the polling information;

applying the one or more user rules to the notification of the match, wherein the one or more user rules specify one or more predetermined types of content associated with the notification of the match that are automatically transmitted;

performing a distance determination by determining whether the approximate location of the GPS enabled device is within a specified distance from a location associated with the matched seller classified profile information;

determining, based on the one or more applied user rules and the distance determination, whether to receive input from the buyer associated with the GPS enabled device prior to transmitting the content associated with the notification of the match;

transmitting the notification of the match and the content associated with the notification of the match to the GPS enabled device via the network in accordance with the determination and the transmission preference indicated by the applied one or more user rules;

receiving purchase request information that comprises a request to purchase one or more items of interest associated with the match from the GPS enabled device via the network; and billing a buyer associated with the GPS enabled device based on at least the purchase request information.

15. The method of claim 1, wherein the predetermined types of content associated with the notification of the match that are automatically transmitted comprises at least one of: content that has a price less than a predetermined maximum amount, and content that has a location that is within a predetermined range from the approximate location of the GPS enabled device.

16. The system of claim 7, wherein the predetermined types of content associated with the notification of the match that are automatically transmitted comprises at least one of: content that has a price less than a predetermined maximum amount, and content that has a location that is within a predetermined range from the approximate location of the GPS enabled device.

17. The method of claim 11, wherein the predetermined types of content associated with the notification of the match that are automatically transmitted comprises at least one of: content that has a price less than a predetermined maximum amount, and content that has a location that is within a predetermined range from the approximate location of the GPS enabled device.

* * * * *